(12) United States Patent
Deschenes et al.

(10) Patent No.: US 9,712,516 B2
(45) Date of Patent: Jul. 18, 2017

(54) MONITORING SIGNED RESOURCES TRANSFERRED OVER A NETWORK

(71) Applicant: BMC SOFTWARE, INC., Houston, TX (US)

(72) Inventors: Danny Deschenes, Montreal (CA); Pierre Larose, St-Basile-le-Grand (CA)

(73) Assignee: BMC Software, Inc., Houston, TX (US)

( * ) Notice: Subject to any disclaimer, the term of this patent is extended or adjusted under 35 U.S.C. 154(b) by 0 days.

(21) Appl. No.: 14/310,539

(22) Filed: Jun. 20, 2014

(65) Prior Publication Data
US 2015/0372821 A1    Dec. 24, 2015

(51) Int. Cl.
*H04L 9/32* (2006.01)
*H04L 29/06* (2006.01)

(52) U.S. Cl.
CPC ........ *H04L 63/0823* (2013.01); *H04L 9/3268* (2013.01)

(58) Field of Classification Search
CPC . H04L 9/3247; H04L 63/123; H04L 2209/60; H04L 2209/72; H04L 63/0823
See application file for complete search history.

(56) References Cited

U.S. PATENT DOCUMENTS

| | | | | |
|---|---|---|---|---|
| 8,161,547 B1* | 4/2012 | Jennings | .............. | H04L 63/02 713/156 |
| 8,862,870 B2* | 10/2014 | Reddy | .............. | H04L 63/0428 713/153 |
| 9,015,804 B2* | 4/2015 | Kalgi | .............. | H04W 12/10 726/3 |
| 9,065,842 B2* | 6/2015 | Vandervort | .............. | H04L 9/3247 |
| 9,083,534 B2* | 7/2015 | Kirk | .............. | H04L 9/3247 |
| 9,166,991 B2* | 10/2015 | Trugman | .............. | H04L 63/1408 |
| 9,178,761 B2* | 11/2015 | Han | .............. | H04L 41/0806 |
| 9,300,520 B2* | 3/2016 | He | .............. | H04L 29/08594 |
| 9,344,282 B2* | 5/2016 | Yoo | .............. | H04L 9/321 |
| 9,397,863 B2* | 7/2016 | Gumbrell | | |
| 9,495,533 B2* | 11/2016 | Yiu | .............. | G06F 21/41 |
| 2010/0223471 A1* | 9/2010 | Fresko | .............. | H04L 63/08 713/176 |
| 2012/0124384 A1* | 5/2012 | Livni | .............. | H04L 9/3247 713/178 |

OTHER PUBLICATIONS

"SOL14620: Managing SSL certificates for BIG-IP systems", F5 Networks, Inc., Sep. 24, 2013, 6 pages.

* cited by examiner

*Primary Examiner* — Yonas Bayou
(74) *Attorney, Agent, or Firm* — Brake Hughes Bellermann LLP

(57) ABSTRACT

A system for monitoring resources transferred over a network includes a capture module that is configured to capture content transferred over a network between a requestor device and a server device. The content includes a resource, a digital signature associated with the resource and a digital certificate associated with the digital signature. The system includes a resource monitor module that is configured to receive the captured content from the capture module. The resource monitor module includes at least one memory, at least one processor and a resource analyzer module that is configured to use the at least one processor to inspect one or more attributes of the digital certificate and inspect the digital signature and verify the digital certificate using the attributes and verify the digital signature.

18 Claims, 3 Drawing Sheets

MONITORING SIGNED RESOURCES TRANSFERRED OVER A NETWORK

TECHNICAL FIELD

This description relates to monitoring signed resources transferred over a network.

BACKGROUND

Content providers, including web application providers, who provide content to end users may have to rely on end user complaints to alert the content providers of a problem related to the content. For example, problems related to the content may be experienced by the end users in the form of security warnings or failures in rendering the content.

SUMMARY

According to one general aspect, a system for monitoring resources transferred over a network includes a capture module that is configured to capture content transferred over a network between a requestor device and a server device. The content includes a resource, a digital signature associated with the resource and a digital certificate associated with the digital signature. The system includes a resource monitor module that is configured to receive the captured content from the capture module. The resource monitor module includes at least one memory, at least one processor and a resource analyzer module that is configured to use the at least one processor to inspect one or more attributes of the digital certificate and inspect the digital signature and verify the digital certificate using the attributes and verify the digital signature.

In another general aspect, a computer-implemented method for executing instructions stored on a non-transitory computer readable storage medium includes capturing content transferred over a network between a requestor device and a server device. The content includes a resource, a digital signature associated with the resource, and a digital certificate associated with the digital signature. The method includes inspecting one or more attributes of the digital certificate and inspecting the digital signature and verifying the digital certificate using the attributes and verifying the digital signature.

In another general aspect, a computer program product is tangibly embodied on a non-transitory computer-readable storage medium and includes instructions that, when executed by at least one computing device, are configured to cause the at least one computing device to capture content transferred over a network between a requestor device and a server device. The content includes a resource, a digital signature associated with the resource and a digital certificate associated with the digital signature. The instructions cause the at least one computing device to inspect one or more attributes of the digital certificate and inspect the digital signature and verify the digital certificate using the attributes and verify the digital signature.

The details of one or more implementations are set forth in the accompanying drawings and the description below. Other features will be apparent from the description and drawings, and from the claims.

DETAILED DESCRIPTION

This document describes systems and techniques for monitoring signed resources transferred over a network. Content is captured and a signed resource in the content is inspected and analysed. A digital signature associated with the resource is inspected along with any digital certificate that is associated with the digital signature, where the digital certificate is used to authenticate the digital signature. The digital certificate and the digital signature may be verified by checking for errors and/or validity of the certificate and/or the signature.

In one example implementation, for a digital certificate and/or a digital signature that includes errors (e.g., the expiration date of the digital certificate has passed), the system notifies the content provider (or other appropriate entity or device) of the error. In another example implementation, for a digital certificate that is about to expire, the system notifies the content provider (or other appropriate entity or device) of the pending expiration. In this manner, in both example implementations, the content provider is notified as part of the system automatically capturing content being delivered to end users. In this manner, the content provider does not need to rely on notification of errors from the end users, because the content provider receives automatic notification as part of the captured content and inspection of the content as it is being delivered to the end-users.

The systems and techniques described in this document constantly monitor the web traffic and automatically extract the artefacts, analyse the digital signatures and certificates, and track their validity and expiration dates. In this manner, the burden on application providers may be reduced in terms of digital signature and digital certificate manual examination and record-keeping. The systems and techniques described in this document may lead to less frequent application errors and less bad user experiences because the provider is notified of potential errors and actual errors in content before it is delivered to the end user. In this manner, the application or content provider may take necessary steps to correct errors or imminent errors associated with resources being delivered to the end-users.

Figure 1:
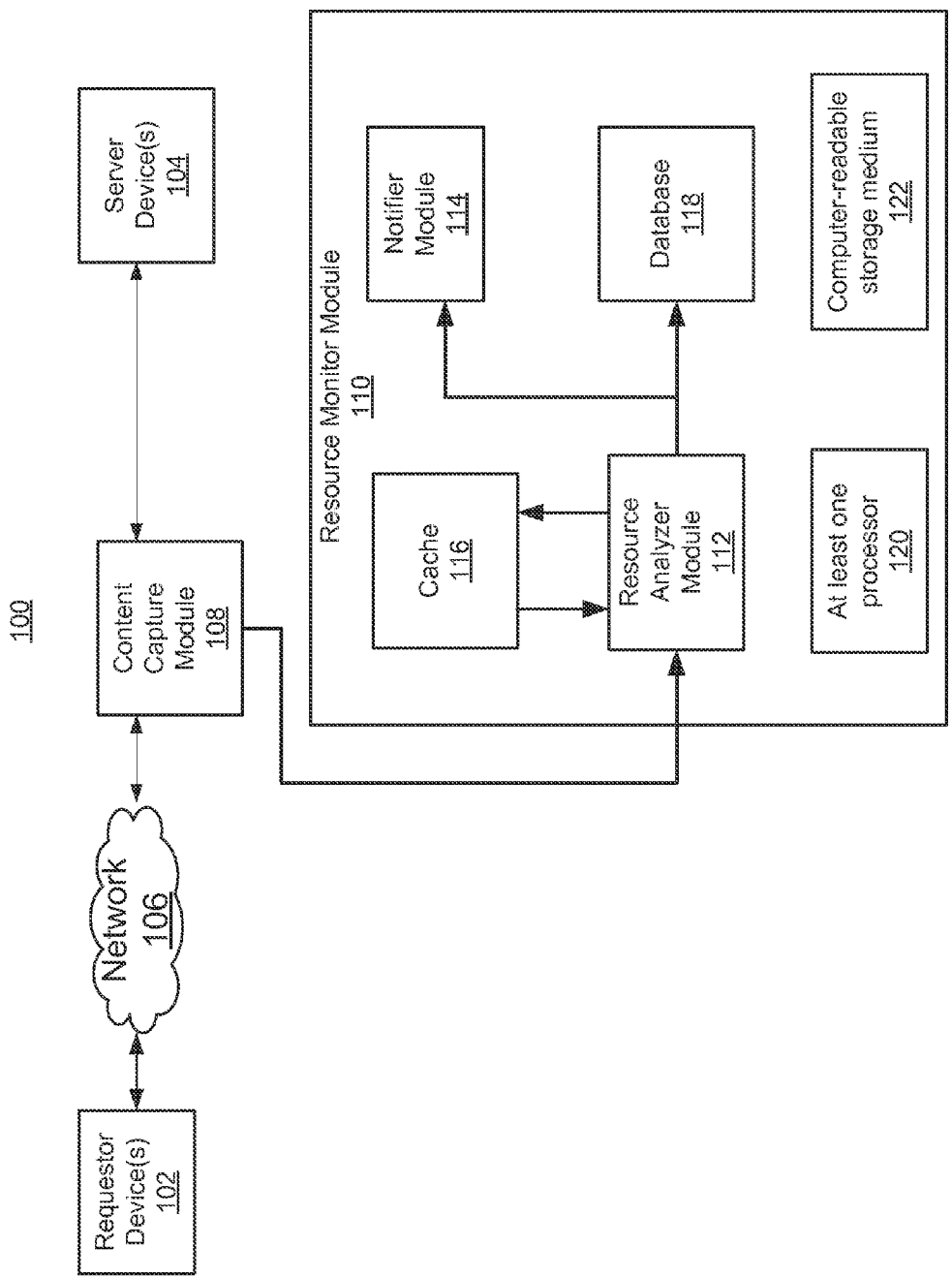
FIG. 1 is an example block diagram of a system for monitoring resources transferred over a network.

FIG. 1 is a block diagram of a system 100 for monitoring resources transferred over a network. The system 100 includes one or more requestor devices 102 that request content from one or more server devices 104 over a network 106. The requestor devices 102 represent devices operated by end users. The requestor devices 102 may include any type of computing device including, but not limited to, a computer, a laptop, a server, a mobile computing device, a tablet, a netbook, a smart phone, or any other type of computing device. The requestor devices 102 may request content from the server devices 104 in any known manner for delivery over the network 106.

The server devices 104 may include any type of server device that is capable of receiving requests for content and delivering the content over the network 106. For example, the server devices 104 may include but are not limited to any type of computing device such as a server, a computer, a mail server, a web application server, and any other type of computing device.

The network 106 may include any type of wired and/or wireless network. The network 106 may include a wide area network or a local area network or a combination of a wide area network and a local area network. The network 106 also may include the Internet.

The system 100 also includes a content capture module 108 and a resource monitor module 110. The content capture module 108, which also may be referred to as a capture module in this document, is configured to and is capable of capturing content transferred over the network 106 between the requestor devices 102 and the server devices 104. For example, the content capture module 108 is configured to capture content being delivered from the server devices 104 to the requestor devices 102 in response to request for content from the requestor devices 102.

In one example implementation, the content capture module 108 is configured to automatically capture the content. The content capture module 108 may be implemented in various different ways in order to automatically capture the content. For instance, the content capture module 108 may be implemented as a physical or virtual tap. In another implementation, the content capture module 108 may be implemented as a mirror/span port. In yet another implementation, the content capture module may be implemented as a Generic Routing Encapsulation (GRE) tunnel. In each of the various different implementations, the content capture module 108 is used to capture the content.

For instance, the content capture module 108 may use passive packet capture to identify and capture content being delivered from the server devices 104. For example, the content capture module 108 may be capable of sniffing traffic that is being transmitted using Transmission Control Protocol/Internet Protocol (TCP/IP). In this manner, the content capture module 108 is capable of intercepting traffic and delivering a copy of the intercepted traffic to the resource monitor module 110.

The content capture module 108 may be placed at various points between the server devices 104 and the requestor devices 102 in order to capture the content. In one implementation, the content capture module 108 may be located at any point along the network 106. In other example implementations, the content capture module 108 may reside within one or more of the server devices 104. In this manner, the content capture module 108 may passively intercept content at the point of the Web server itself.

The content that is captured by the content capture module 108 may include one or more different types of resources, including signed resources. A signed resource includes a resource that has been digitally signed using a digital signature, where the digital signature is authenticated using a digital certificate. The digital signature may be generated in any known manner including using a hash code on the resource. The digitally signed resources may be provided from the server devices 104 to the requestor devices 102 such that the requestor devices are assured of the authenticity and security of the delivered resource. A rendering program (for example, a browser application) may use the digital signature and digital certificate to verify the authenticity of the resource for security reasons before rendering the resource to display to the end-user. Signed resources that include invalid digital signatures and/or digital certificates may be rejected by the rendering program and not rendered at the requestor device 102.

The resources that are included as part of the content may include different formats, including formats for Rich Internet Application resources. For example, the resources may include an applet/javafx.jar file, activex.cab files, an adobe.air file, an adobe.pdf file, a ms silverlight.xap file, and a mozilla.xpi package. Other examples of resources may include web applications such as mobile web applications. Other types of resources are also contemplated. Each of these example resources may be signed resources using a digital signature and a digital certificate.

In one example implementation, the content capture module 108 may be configured to capture only content with specific types of resources. For example, the content capture module 108 may be configured to capture content with specific extensions or specific file types and to not capture other types of content.

Figure 2:
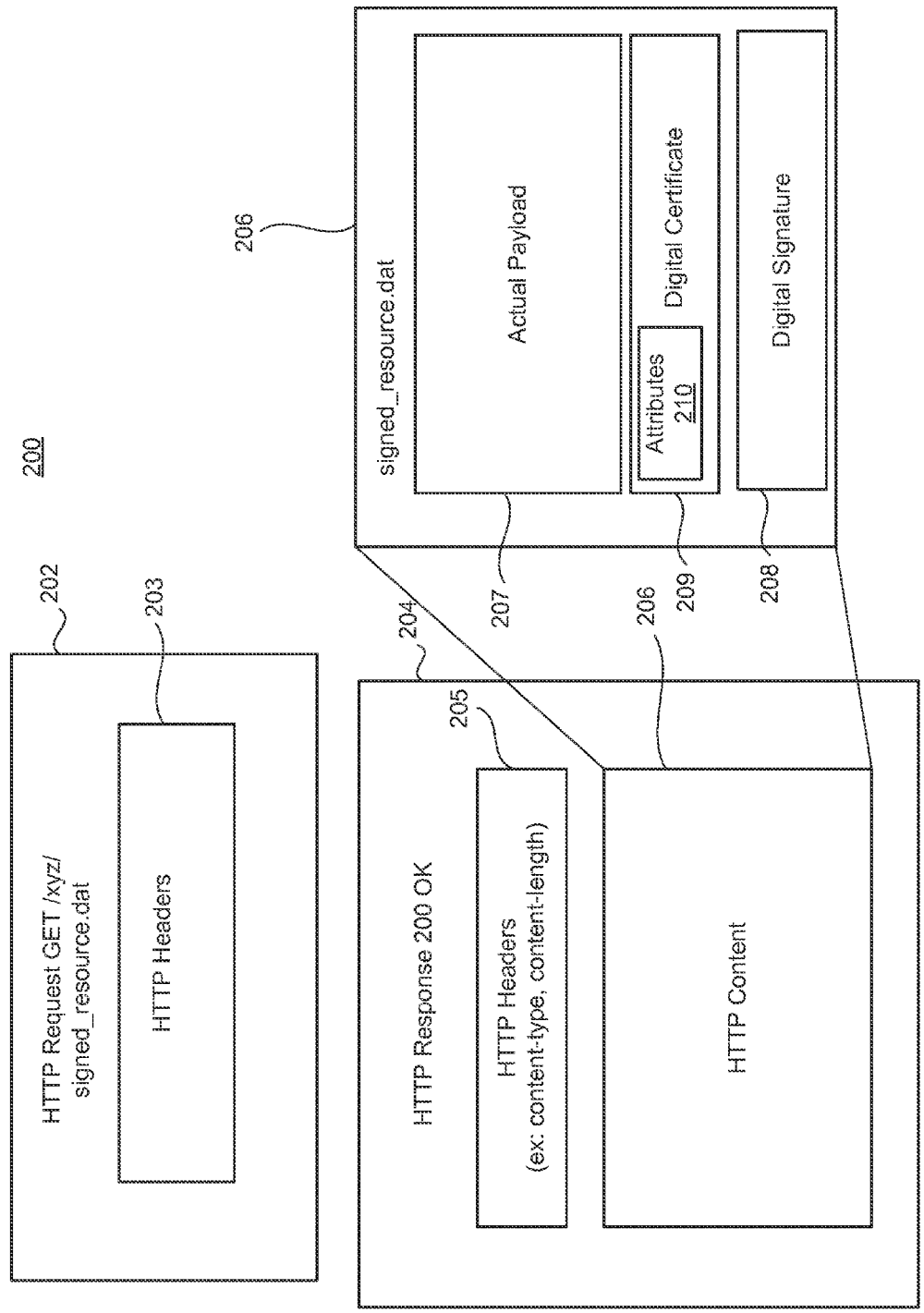
FIG. 2 is a schematic diagram of example content.

Referring to FIG. 2, an example schematic diagram 200 illustrates content being delivered from a server device to a requestor device. In this example schematic diagram 200, and example single Hypertext Transfer Protocol (HTTP) transaction over a TCP/IP connection is illustrated. This is merely just one example of content being delivered between the requestor device and a server device. Other formats and connection types are contemplated and may be used as part of the system and techniques described in this document.

In the example of FIG. 2, an HTTP request 202 may be initiated from a requestor device, such as a requestor device 102 from FIG. 1. The HTTP request 202 may use a GET method to request a resource, which in this example is a request for a signed resource. The request for the signed resource also includes HTTP headers 203. Other types of methods may be used to request a resource.

A server device responds to the HTTP request 202 and provides HTTP response 204. The HTTP response 204 includes HTTP headers 205 and HTTP content 206. The HTTP headers 205 may include information that describes the content type, the content length, and other information about the content. The resource type may be identified from the files extension and/or response mime type. Other information within the bytes of the HTTP headers 205 may be used to identify the content and specifically the resource type contained within the content. The content capture module 108 may use the information contained in the HTTP headers to identify the content and determine whether or not to capture the content based on the identity of the content.

The HTTP content 206 includes the resource being delivered to the requestor device. The HTTP content 206, in this example, includes a signed resource labelled as signed_resource.dat, which is the content that was requested as part of the HTTP request 202.

The HTTP content 206 includes the actual payload (or resource) 207, the digital signature 208 associated with the actual payload 207, and a digital certificate 209 that authenticates digital signature 208. The actual payload 207 includes the resource, examples of which were described above. The digital signature 208 is associated with the payload 207.

The digital certificate 209 includes one or more attributes 210. The attributes 210 may include an expiration date or other information related to the authenticity and validation of the digital certificate 209. If the digital certificate 209 includes an expired expiration date, then the requestor device may not trust the requested resource and the resource may not be rendered for the end user on the requesting device.

Referring back to FIG. 1, the content capture module 108 may deliver a copy of the captured content to the resource monitor module 110. The resource monitor module 110 may receive a copy of the intercepted content. The resource monitor module 110 includes a resource analyzer module 112, a notifier module 114, a cache 116, a database 118, at least one processor 120 and a computer-readable storage medium 122.

The resource analyzer module 112 receives the content from the content capture module 108. The resource analyzer module 112 is configured and capable of inspecting the content including the resource, the digital certificate and the digital signature. The resource analyzer module 112 is configured to verify the digital certificate and to verify the digital signature. In this manner, the resource analyzer module 112 is able to determine the validity of the signed resource being delivered from the server 104 device to the requestor device 102 in a passive manner. That is, the content is automatically captured by the content capture module 108 and is sent directly to the resource analyzer module 112 for inspection and verification of the signed resource.

The resource analyzer module 112 may inspect the content by accessing the payload, the digital signature and the digital certificate. In one example implementation, the resource analyzer module 112 may inspect the digital certificate by examining one or more attributes of the digital certificate. For example, the resource analyzer module 112 may inspect the expiration date of the digital certificate that is associated with the digital signature, where the digital certificate is used to authenticate the digital signature. If the digital analyzer module determines that the expiration date has passed, meaning that it is expired when compared to the current date, then the resource analyzer module 112 may send the information regarding the expired digital certificate to the notifier module 114. The notifier module 114 may receive the notification of the expired digital certificate and communicate or notify the server device 104 (or other appropriate device or entity) that the digital certificate is expired.

In another example, the resource analyzer module 112 may inspect the expiration date of the digital certificate that is associated with the digital signature, where the digital certificate is used to authenticate the digital signature. If the digital analyzer module 112 determines that the expiration date is near, meaning that it will expire within a predetermined or configurable amount of time compared to the current date, then the resource analyzer module 112 may send the information regarding the upcoming expiration of the digital certificate to the notifier module 114. The notifier module 114 may receive the notification of the expiring digital certificate and communicate or notify the server device 104 (or other appropriate device or entity) that the digital certificate is about to expire.

In another example, the resource analyzer module 112 may inspect other attributes of the digital certificate that are associated with the digital signature, where the digital certificate is used to authenticate the digital signature. For instance, the resource analyzer module 112 may inspect the digital certificate and verify that it includes an error, where the error is that the certificate has been revoked. Similarly, the resource analyzer module 112 may inspect the digital certificate and verify that the digital certificate includes an error that indicates the digital certificate is invalid.

In another example, the resource analyzer module 112 may inspect the digital certificate chain validation. If the resource analyzer module 112 determines that there is an error in the certificate chain validation, then the resource analyzer module may notify the notifier module 114. The notifier module 114 may receive the notification of the error in the certificate chain validation and notify the server module 104 (or other appropriate device or entity) of the error.

In another example implementation, the resource analyzer module 112 may inspect the digital signature that is associated with the signed resource. If the resource analyzer module 112 detects that the digital signature is not valid, then the resource analyzer module 112 notifies the notifier module 114. The notifier module 114 may then send a notification to the server module 104 (or other appropriate device or entity) indicating that the digital signature is not valid.

In another example, the resource analyzer module 112 may inspect an unsigned resource and determine whether or not the unsigned resource should have been signed, for instance according to detection rules. For example, an unsigned resource may have mistakenly been unsigned and the resource analyzer module 112 would detect this error and send a signal to the notifier module 114. The notifier module 114 may then notify the server device 104 (or other appropriate device or entity) of the error associated with the unsigned resource. Other examples of where an unsigned resource should have been signed may be detected by matching a URI pattern or checking for particular content types that should be signed but are not signed.

The notifier module 114 may send notifications to the server device 104 that sent the content to the requestor device 102. Additionally and/or alternatively, the notifier module 114 may send notifications to an appropriate device and/or user (or entity) that needs and can act on the information provided in the notification. The notifier module 114 may use any one of different types of communications in order to send the notification. For example, the notifier module 114 may send the notification by email, Short Message Service (SMS), instant messaging, or other electronic communication means capable of providing the desired notification to the server device 104. In this manner, the server device 104 is provided with a notification when there is an error or potential error associated with a signed resource sent by the server device 104. As discussed above, the error may reside in either or both of the digital signature and the digital certificate. The server device 104 would not need to rely upon notification from the requestor device 102 when there is an error associated with the signed resource. Instead, the error is automatically detected during the process that passively captures the signed resource by the content capture module 108 and the inspection and verification of the signed resource by the resource analyzer module 112 in combination with the notifier module 114.

The resource monitor module 110 also includes a cache 116 and a database 118. The cache 116 may be configured to store inspection and verification results of the signed resources from the resource analyzer module 112. That is, when the resource analyzer module 112 inspects and verifies a signed resource, then the results of the inspection and verification may be stored in the cache 116. In one example implementation, the stored results from the cache 116 may be used to identify other signed resources that include errors in their digital signature and/or digital certificate. For example, content that is captured having an identical resource as previously captured content may be analysed by the resource analyzer module 112 using the cache verification results of the previously captured content.

The database 118 may be used to store other information related to the inspection and verification process for the signed resources. For example, the database 118 may include one or more reports related to the notification of the server devices 114 when there is an error with one of their signed resources. The database 118 also may include other information related to the inspection of the digital certificates. For example, the database 118 may be used to pull information related to occurrences of errors. The database 118 also may be used to aggregate such errors by types and by time, where the information may be used to plot reports or archive historical events. The information captured by the database 118 also may be used for trend analysis and other reporting information.

The resource monitor module 110 also may include at least one processor 120 and at least one non-transitory computer-readable storage medium 122. The at least one processor 120 may represent two or more processors executing in parallel, and the non-transitory computer-readable storage medium 122 may represent virtually any non-transitory medium that may be used to store instructions for execution by the at least one processor 120. The components within the resource monitor module 110 may use the instructions stored in the computer-readable storage medium 122 as executed by the at least one processor 120 to perform their actions and functions.

Figure 3:
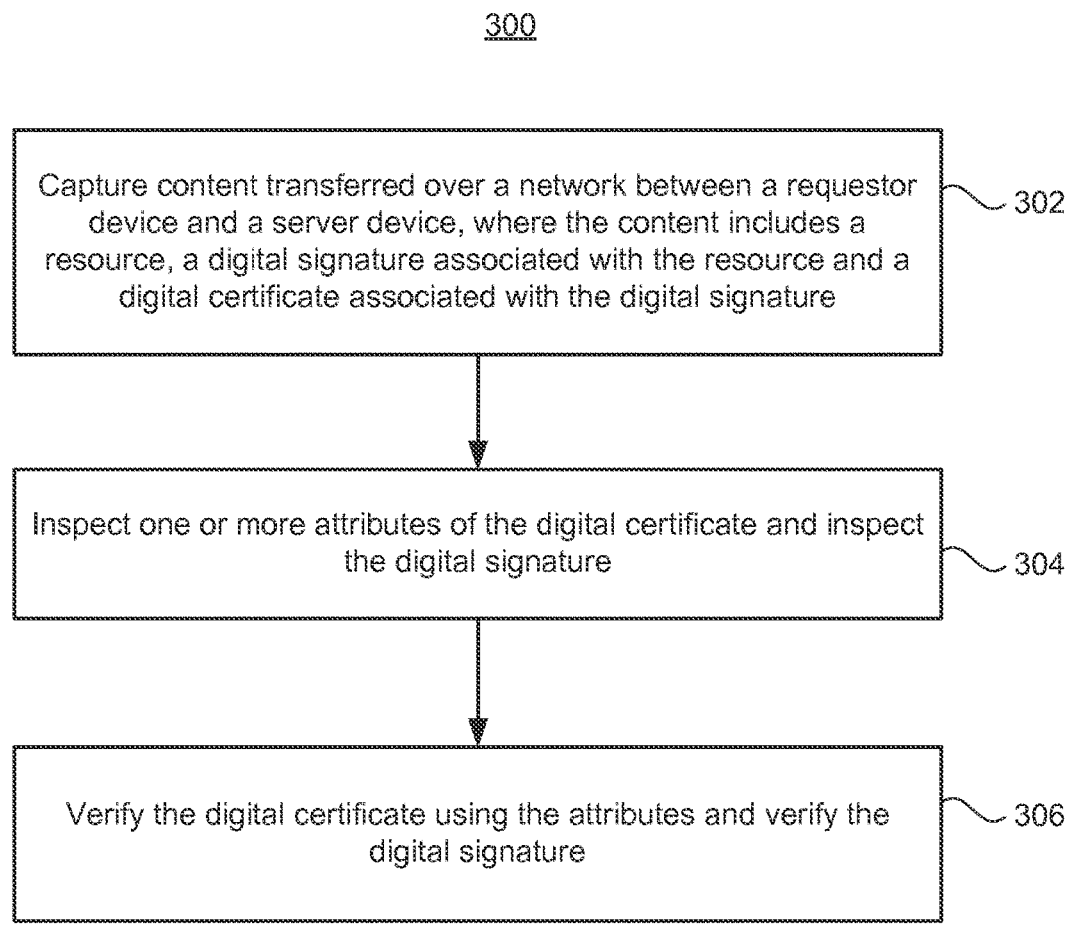
FIG. 3 is a flowchart illustrating example operations of the system of FIG. 1.

Referring to FIG. 3, an example flowchart illustrates a process 300 for monitoring signed resources. Process 300 includes capturing content transferred over a network between a requestor device and a server device. The content includes a resource, a digital signature associated with the resource and a digital certificate associated with the digital signature (302). For example, with reference to FIG. 1, the content capture module 108 may capture content transferred over the network 106 between a requestor device 102 and a server device 104. The signed resource may include a digital signature from the server device 104 or otherwise. The digital certificate may be used to authenticate the digital signature. The content capture module 108 may communicate the captured content to the resource monitor module 110. The content capture module 108 may passively capture and copy the content being served to the requestor device 102.

In some example implementations, only certain types of content may be captured. Of the captured content, a portion of the captured content may be copied and communicated to the resource monitor module 110.

Process 300 includes inspecting one or more attributes of the digital certificate and inspecting the digital signature (304). For example, with reference to FIG. 1, the resource analyzer module 112 may inspect one or more attributes of the digital certificate and inspect the digital signature. For instance, the inspection of the attributes may include an inspection of an expiration date for the digital certificate.

Process 300 includes verifying the digital certificate using the attributes and verifying the digital signature (306). For example, with reference to FIG. 1, the resource analyzer module 112 may verify the digital certificate using the attributes and verify the digital signature. For instance, the resource analyzer module 112 may use the expiration date and compare the expiration date with a current date to verify whether or not the digital certificate has expired. If the digital certificate is expired, the resource analyzer module 112 may notify the notifier module 114. The notifier module 114 may then provide a notification of the expired digital certificate to the server device 104. Additionally, the resource analyzer module 112 may verify the digital certificate by comparing the expiration date of the digital certificate to a current date. If the digital certificate is about to expire, the resource analyzer module 112 may notify the notifier module 114 that the digital certificate is about to expire.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system for monitoring resources transferred over a network, the system comprising:
   at least one memory including instructions on a computing device; and
   at least one processor on the computing device, wherein the processor is operably coupled to the at least one memory and is arranged and configured to execute the instructions that, when executed, cause the processor to implement:
      a capture module that is arranged and configured to capture content transferred over a network between a requestor device and a server device, wherein the content includes:
         a resource,
         a digital signature associated with the resource, and
         a digital certificate associated with the digital signature; and
      a resource monitor module that is operably coupled to the capture module and that is configured to receive the captured content from the capture module, wherein the resource monitor module comprises:
         a resource analyzer module that is configured to:
            inspect one or more attributes of the digital certificate and inspect the digital signature, and
            verify the digital certificate using the attributes and verify the digital signature; and
         a notifier module that is operably coupled to the resource analyzer module and that is configured to provide a notification back to the server device in response to the resource analyzer module verifying an error with the digital certificate or an error with the digital signature.

2. The system of claim 1 wherein:
   the attributes of the digital certificate include an expiration date; and
   the resource monitor analyzer module is configured to verify the digital certificate using the expiration date.

3. The system of claim 2 wherein the notifier module is configured to notify the server device when the resource analyzer module verifies the expiration date of the digital certificate is expired.

4. The system of claim 2 wherein the notifier module is configured to notify the server device when the resource analyzer module verifies the expiration date of the digital certificate is within a predetermined period of time before the expiration date.

5. The system of claim 1 wherein the notifier module is configured to notify the server device when the resource analyzer module verifies the digital signature is not valid.

6. The system of claim 1 wherein the resource monitor module further includes a cache module that is operably coupled to the resource analyzer module and that is configured to store verification results from the resource analyzer module.

7. The system of claim 6 wherein the resource analyzer module is further configured to analyze content having an identical resource as previously captured content using the cached verification result of the previously captured content.

8. A computer-implemented method for executing instructions stored on a non-transitory computer readable storage medium, the method comprising:
   capturing content transferred over a network between a requestor device and a server device, wherein the content includes:
      a resource,
      a digital signature associated with the resource, and
      a digital certificate associated with the digital signature;
   inspecting one or more attributes of the digital certificate and inspecting the digital signature;
   verifying the digital certificate using the attributes and verifying the digital signature; and
   providing a notification back to the server device in response to verifying an error with the digital certificate or an error with the digital signature.

9. The method as in claim 8 wherein the attributes of the digital certificate include an expiration date, the method further comprising:
   verifying the digital certificate using the expiration date.

10. The method as in claim 9 wherein notifying the server device comprises notifying the server device when the verification of the expiration date indicates the digital certificate is expired.

11. The method as in claim 9 wherein notifying the server device comprises notifying the server device when the verification of the expiration date indicates the digital certificate is within a predetermined period of time before the expiration date.

12. The method as in claim 8 wherein notifying the server device comprises notifying the server device when the verification of the digital signature is not valid.

13. The method as in claim 8 further comprising storing verification results in a cache module.

14. The method as in claim 13 further comprising analyzing content having an identical resource as previously captured content using the cached verification result of the previously captured content.

15. A computer program product, the computer program product being tangibly embodied on a non-transitory computer-readable storage medium and comprising instructions that, when executed by at least one computing device, are configured to cause the at least one computing device to:
   capture content transferred over a network between a requestor device and a server device, wherein the content includes:
      a resource,
      a digital signature associated with the resource, and
      a digital certificate associated with the digital signature;
   inspect one or more attributes of the digital certificate and inspect the digital signature;
   verify the digital certificate using the attributes and verify the digital signature; and
   provide a notification back to the server device in response to verifying an error with the digital certificate or an error with the digital signature.

16. The computer program product of claim 15 wherein the attributes of the digital certificate include an expiration date, and further comprising instructions that, when executed by the at least one computing device, are configured to cause the at least one computing device to:
   verify the digital certificate using the expiration date; and
   notify the server device when the verification of the expiration date indicates the digital certificate is expired.

17. The computer program product of claim 15 wherein the attributes of the digital certificate include an expiration date, and further comprising instructions that, when executed by the at least one computing device, are configured to cause the at least one computing device to:
  verify the digital certificate using the expiration date; and
  notify the server device when the verification of the expiration date indicates the digital certificate is within a predetermined period of time before the expiration date.

18. The computer program product of claim 15 further comprising instructions that, when executed by the at least one computing device, are configured to cause the at least one computing device to notify the server device when the verification of the digital signature is not valid.

* * * * *